Jan. 6, 1931.  O. A. ROSS  1,788,359
PISTON AND METHOD OF FORMING THEREOF
Filed Feb. 27, 1926   3 Sheets-Sheet 1
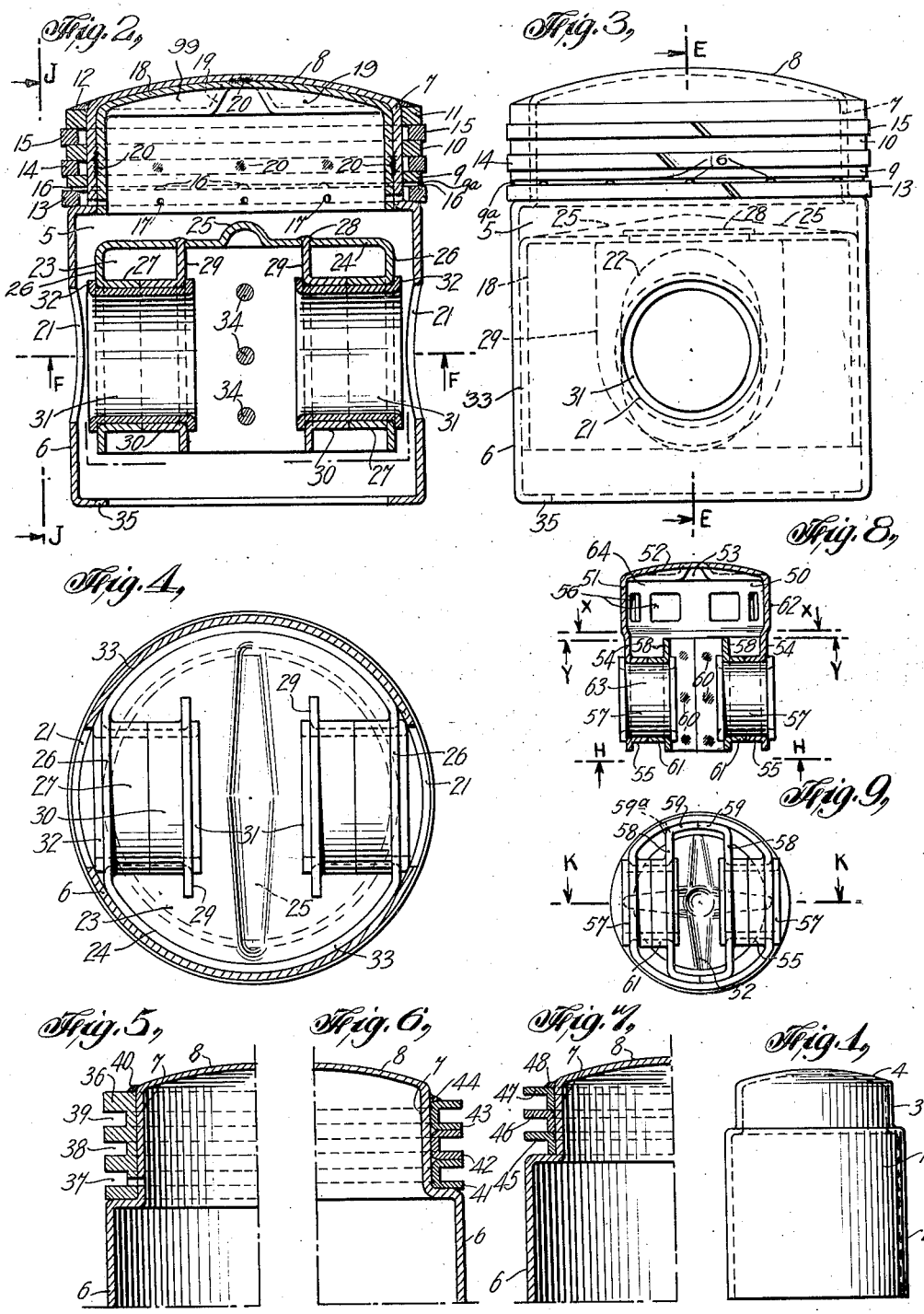

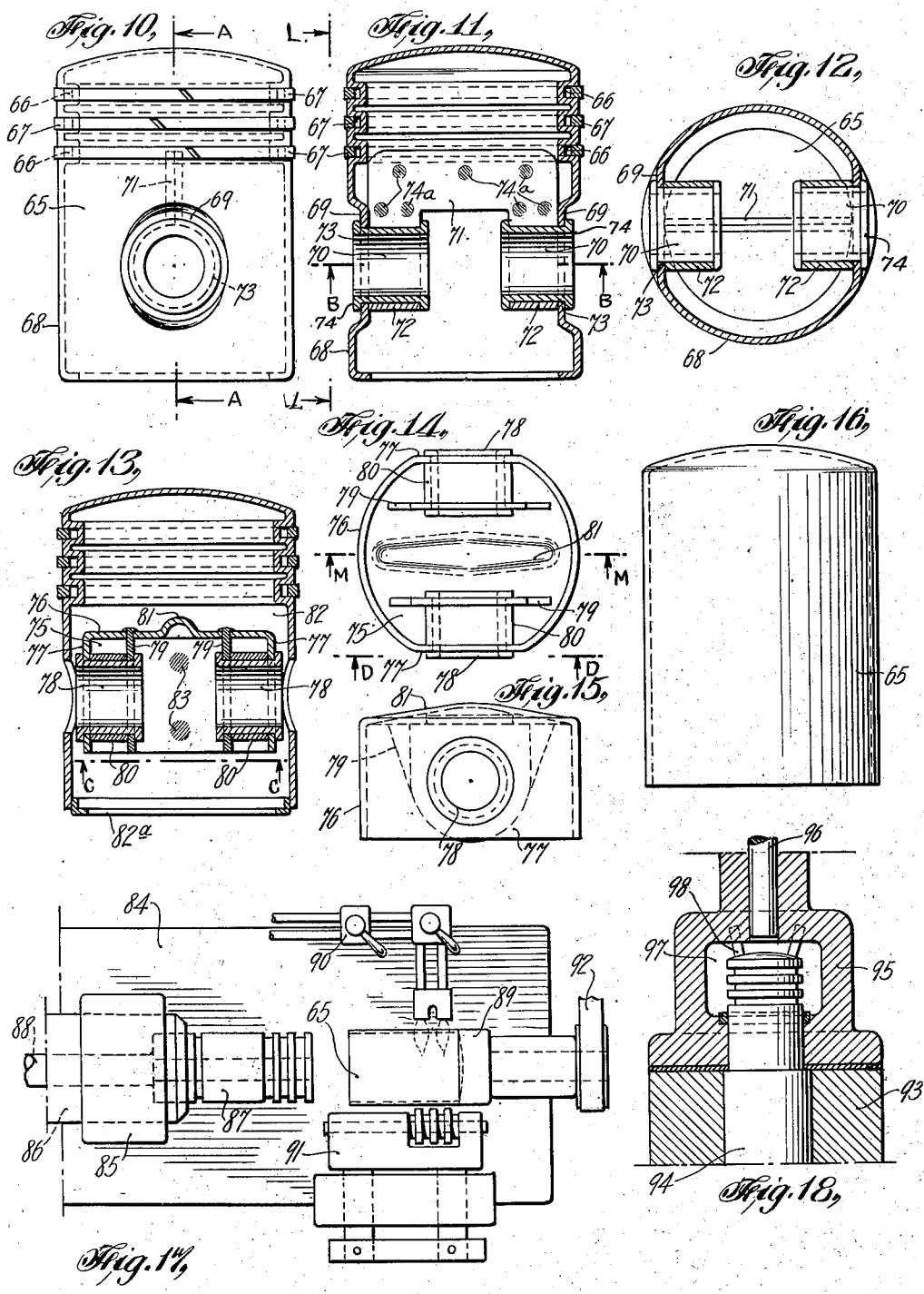

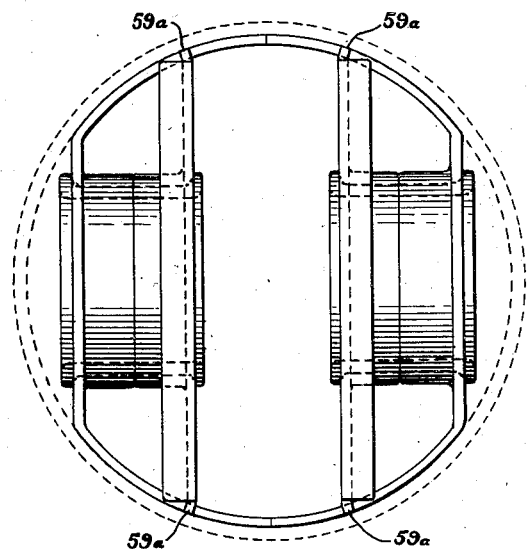
Fig. 19,
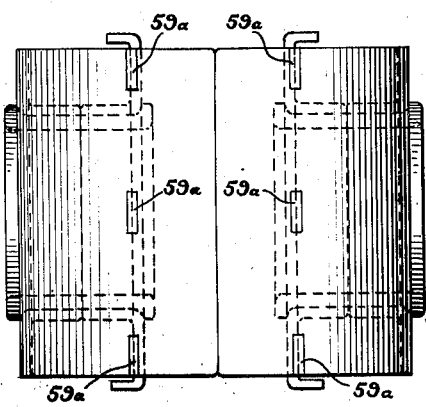
Fig. 20,
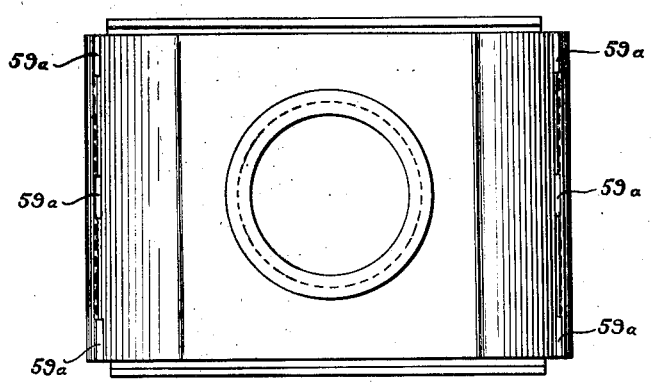
Fig. 21,

Patented Jan. 6, 1931

1,788,359

UNITED STATES PATENT OFFICE

OSCAR A. ROSS, OF NEW YORK, N. Y.

PISTON AND METHOD OF FORMING THEREOF

Application filed February 27, 1926. Serial No. 91,149.

This invention relates to pistons and more particularly to that class of pistons employed in internal combustion engines, or motors.

The superior qualities of cast iron and drawn, or rolled steel machined surfaces operating against each other as bearing surfaces is well known and it is also recognized, that, for purposes of economic structure, the cylinders of internal combustion motors should preferably be made from cast iron, or its alloys. One object of this invention is to produce a piston for said motors, the shell of which is of stamped, or drawn metal, preferably, drawn, or cold rolled steel, whereby drawn, or rolled metal surfaces are obtained as bearing surfaces to operate against the cast iron walls of the cylinders of said motors.

It is also well recognized that a device which may be wholly, or in part, made from metal stampings, can be more economically manufactured than if made from castings. Another object of this invention is to produce a piston for internal combustion motors having novel forms of structure, and means for obtaining the same, whereby a complete piston, ready to receive a piston pin and piston rings, will be made from stampings.

Another object is to furnish a piston for internal combustion motors having novel forms of re-enforcement whereby said piston is restrained to maintain substantially its original form during normal operation in said motor.

Another object is to produce a piston for internal combustion motors, wherein, and if desired, the unit supporting the piston pin will be mounted independent of the skirt, in this manner preventing any deflection, which might occur in said skirt, from affecting the alignment of the bearings supporting said piston pin.

It is known that various makes of internal combustion motors have pistons of the same diameter. However, their piston pins are located at different axial relations with respect to the top of said pistons, also, that pistons of the same diameter and having the same relative axial location may have piston pins of varying diameters. Another object of this invention is to furnish a piston for internal combustion motors having a separate member for supporting the piston pin and of such novel construction whereby said separate member may be assembled at various axial points within said piston, in this manner permitting a manufacturer who makes a specialty of piston manufacture, to stock up on piston shells and piston pin bearing members and later assemble them together to meet the particular requirement of pistons as may be ordered by a customer.

Another object is to furnish a piston for internal combustion motors of substantially light weight. It is known that a considerable portion of the energy developed in said motors is consumed by the motion of the reciprocating parts and that the reduction of the weights of said parts will increase the efficiency of said motor. Applicant's novel method of employing a substantially all stamped piston, permits the manufacture of a piston, not only light in weight, but also of rigid construction and having wearing surfaces of excellent wearing material.

Another object of this invention is to produce a piston for internal combustion motors, wherein a novel means is incorporated to collect and return to the crank-case of said motor, any excess oil, existing between the bearing surfaces of said piston and the cylinder walls of said motor, said means being accomplished without materially weakening of the oil collecting ring employed in connection therewith.

Another object is to furnish a piston wherein the piston pin hubs or bearings supporting the piston pin, are supported in a manner to provide a comparatively long path of heat transfer from the head, or hottest portion of the piston, to the hubs, or bearings, this path being formed substantially longer than the path from the head of the skirt whereby the heat of the head may be readily conducted to the cylinder walls through the skirt without passing to the hubs or bearings.

Another object is to furnish a piston wherein the skirt portion is novelly re-enforced along the lines of greatest side thrust during the operation of the piston in a motor whereby the cylindrical form is restrained from substantially distortion to cause binding in the cylinder bore, the re-enforcements also forming means for supporting the piston pin hubs or bearings independently of the head or skirt portions.

Another object is to furnish novel methods of forming pistons and parts therefor from sheet metal.

Other objects and advantages will appear as the description of the invention progresses, and the novel features of the invention will be pointed out in the appended claims.

This invention consists of the novel construction and arrangement of parts hereinafter described, delineated in the accompanying drawings, and particularly pointed out in that portion of the instrument wherein patentable novelty is claimed for certain and peculiar features of the device, it being understood that, within the scope of what hereinafter thus is claimed, divers changes in the form, proportions, size and minor details of the structure may be made, without departing from the spirit or sacrificing any of the details of the invention.

In describing the invention in detail, reference is had to the accompanying drawings, wherein I have illustrated embodiments of my invention, and wherein like characters of reference, designate corresponding parts throughout the several views, and in which:—

Figure 1, is an elevated view of one form of a stamping comprising the piston shell, and, Fig. 2, is a sectional view of one form of complete piston taken on line E—E of Fig. 3, and Fig. 3, is an elevated view of the same piston taken on line J—J of Fig. 2, and, Fig. 4, is a part section, part elevated view of the bottom of said piston, taken on line F—F of Fig. 2, and, Figs. 5, 6, 7, are modified forms of piston ring supports, and, Fig. 8, is a sectional view of a combined re-enforcing unit and piston pin bearing unit, and is taken on line K—K of Fig. 9, and, Fig. 9, is an elevated bottom view of the same unit, and Fig. 10, is an elevated view of a modified form of piston taken on line L—L of Fig. 11, and, Fig. 11, is a sectional view of the same piston taken on line A—A of Fig. 10, and, Fig. 12, is a part sectional, part elevated view of the same piston taken on line B—B of Fig. 11, and, Fig. 13, is a sectional view of a modified form of piston, wherein the axial location of the wrist, or piston pin bearing unit may be varied, and is taken on line M—M of Fig. 14, and, Fig. 14, is a bottom view of the piston pin bearing unit, taken on line C—C of Fig. 13, the piston shell being omitted, and, Fig. 15, is an elevated view of the same unit taken on line D—D of Fig. 14, and, Fig. 16, is an elevated view of the stamping, or shell of the piston shown in Figs. 10 to 13 inclusive, and Fig. 17, is a diagrammatic view of a machine for forming the piston ring grooves in the piston shell, Fig. 18, is a part sectional, part elevated view of another machine for accomplishing the same purpose in a different way, and Figs. 19, 20 and 21, are elevated views of a modified form of piston pin bearing support.

Referring to Fig. 1, piston shell 1, comprises a stamped, or drawn shell, or cup having a cylindrical skirt 2, and a reduced diameter ring support 3 with a crown shaped head 4, said ring support being adapted to receive piston rings and their supports, or guides externally, and a re-enforcing member internally as will be hereinafter more fully described.

Referring to Figs. 2, 3 and 4, piston shell 5, primarily of the same form as shell 1, comprises skirt 6, reduced section 7, and head 8. Pressed over, or shrunk onto said reduced section 7, are piston ring guides 9, 10 and 11, the latter being preferably welded to place by weld 12, and act to locate piston rings 13, 14 and 15. Guide ring 9, is supplied with a plurality of notches as 16—16 and an annular groove 9a, adapted to conduct oil collected by ring 13, and pass said oil to the plurality of orifices 17—17 in reduced section 7, and thence to the interior of the piston returning it to the crank case of the particular internal combustion motor in which the piston may be operating. Preferably after guide rings 9, 10 and 11, are located, re-enforcing member 18, a stamping, having re-enforcements 19—19, is pressed into the interior of the reduced section 7 and suitably secured, as for example, by the spot welds 20—20. Member 18, is preferably a press fit in the reduced portion 7, thereby not only producing a stiffer, or more rigid construction, but also tending to more securely locate the guide rings 9, 10 and 11. Skirt 6 has diametrically located openings 21—21, through which the piston pin is entered, and, whereas shown as being round, is preferably elongated, as shown by dotted line 22, in this manner permitting variable axial location of the piston pin bearing unit 23 as may be desired, and before said unit is permanently secured to place. Wrist, or piston pin bearing unit 23, comprises a stamped, or drawn metal cup, or shell 24, having re-enforcing rib 25, and flattened sides 26—26, perforated and stamped to form bearing supports 27—27. Preferably adapted to be located by tongue 28 and welded to cup 23, are bracket members 29—29, suitably perforated and stamped, or punched, to form bearing supports 30—30. Said brackets are welded to place with an arbor passed through bearing supports 29—29 and 30—30, after which said supports are reamed, or machined to receive bearings 31—31, one end of which is flanged before assembly, the free end entering supports 29 and 30, preferably from the inside of said unit, and, after being pressed to location, are stamped, rolled, or welded to form flange 32. The exterior surface 33, of cup 23, may be machine finished, preferably a sucking fit with regard to the interior of skirt 6, and, if its exact location has been determined in said skirt, it is rigidly secured, as for example, by spot welds 34—34, whereafter flange 35 is formed at the bottom of said skirt in any known manner. If desired the unit 23 may be assembled into the skirt 6 without permanent location and flange 35 formed thereafter. This permits stocking a piston with a given diameter and a given size piston pin hole, but with a variable dimension as to the distance from the top of the piston to the center line of said hole. Under such circumstances the elongated hole 22 is employed. Whereas four re-enforcing ribs, as 19, are shown, this number may be increased to six, or eight if desired.

Referring to Fig. 5, whereas in Figs. 2, 3, and 4, the guide rings 9, 10 and 11, are shown as three separate members, they may be made up as one member 36, having ring grooves 37, 38 and 39, and pressed over the reduced section 7, and suitably secured thereto, as for example by weld 40.

Referring to Fig. 6, the modified ring support members as 41, 42 and 43, comprise stamped circular channel rings pressed over reduced section 7 and suitably secured thereto by weld 44. The channels in said rings are adapted to receive the piston rings, and, if desired, may be machined after assembly onto the piston, and before receiving said rings.

Referring to Fig. 7, the modified ring groove members 45, 46 and 47, comprise stamped angle rings, circular in form, pressed over the reduced section 7, and secured thereto, as for example, by the weld 48. After assembly onto said piston section they may be machined before receiving the piston rings. In any of the modifications shown in Figs. 5, 6, or 7, the notches 16 annular groove 9a and orifices 17 for oil conduction may be added.

Referring to Figs. 8 and 9, comprising a combined head re-enforcing and wrist pin bearing unit 50; stamping or drawn shell, or cup member 51, of cylindrical form, has head portion 52, containing re-enforcing ribs 53—53. The walls of cup member 51, have flattened sides 54—54 suitably perforated and stamped, or punched, to form bearing supports 55—55. Suitable weight reducing orifices, as 56—56, may be made. The inner end of wrist, or piston pin bearings 57—57 are supported by brackets 58—58, running transversely, and having curved ends 59—59, adapted to impinge against the inner wall of cup 51, and to which they are secured, preferably by welds 60—60. If desired the curved ends 59 may be made to enter a notch, or slot in the wall of cup 51, as shown in Figs. 19, 20 and 21, said notch, or slot acting to locate the end 59a in said bracket, and, after which the ends 59a are welded, or otherwise secured to said wall. Said brackets are suitably perforated and stamped to form bearing supports 61—61. Bearing supports 55—55, and 61—61, are aligned with a suitable arbor when brackets 58—58 are welded to place, and thereafter may be machined before bearings, as 57—57, are pressed into place as has been hereintofore described. When unit 50 is to be employed as a combined head re-enforcing member and a piston pin bearing support, the surface 62 of the cylindrical head portion is preferably machine finished for a press fit into the reduced section 3 of piston 1, and, after assembly into said piston, is rigidly secured by welding as has been heretofore described. The lower portion of cup 51, and as viewed on line H—H, may be stamped of a diameter slightly smaller than the inner diameter of the skirt 2, whereby any deflections caused in said skirt will not be transmitted by said skirt to the skirt of cup 51 containing the piston pin bearings 57—57. Under most conditions of practice however, the skirt of cup 51 is made a sucking fit in skirt 2, and is suitably secured thereto, as for example by spot welding, in this manner making a stiff rigid unyielding construction.

If desired the unit 50 may be made as two parts 63 and 64, the section between lines X and Y being omitted in construction; or the piston pin bearing unit 63 may be employed independently of the head re-enforcing unit 64. The unit 63 has special advantages in that the brackets 58—58, act to brace the skirt 2 transversely, and in a plane of the greatest transverse stresses when said piston is in normal operation. Unit 63, may be employed in the same manner and location as unit 23, and may be made interchangeable therewith.

Referring to Figs. 10, 11 and 12, comprising a modified form of piston with a shell 65, the original form of which was similar to that shown in Fig. 16, and in which grooves, as 66—66 have been formed to receive piston rings, as 67—67. Arranged on a diametrical plane of skirt 68 are stamped depressions 69—69 having perforations 73—73 to receive one end of piston pin bearings 70—70. Said bearings are, in conjunction with said perforations 73—73, supported by the inverted U shaped member 71, comprising a rectangular stamped sheet having a substantially symmetrically disposed rectangular opening, part of the longer sides of which, are formed into tubular bearing supports 72—72 adapted to secure bearings 70—70. Bearings 70—70 are pressed into supports 72—72, preferably from the interior of the piston, passing through said supports and perforations whereafter the ends 74—74 are rolled, stamped, or welded into a flange thereby rigidly locking said bearings, member 71 and skirt 68 together against movement. Welds, or rivets, as 74a—74a serve to restrain tubular supports 72—72 from variation in diameter and create a more substantial structure.

Referring to Figs. 13, 14 and 15, comprising a modified form of piston shown in Figs. 10, 11 and 12; the member 71 has been replaced by a piston pin bearing support 75 comprising a stamped, or drawn metal cup 76, having flattened sides 77—77, suitably perforated to receive one end of bearings 78—78. Brackets 79—79, similar in construction to brackets 29—29, except that the tubular extensions 30—30 have been omitted and the area of attachment made larger, are secured preferably in the same manner and are adapted to receive the opposite ends of bearings 78—78. Said bearings are flanged on one end before assembly, and, in assembly the free end is passed through bracket 79, thence through sleeve 80 and perforation in flattened side 77, whereafter said free end is rolled, stamped, or welded over to clamp said wall 77, bracket 79 and bearing 78 into one rigid unit. A suitable re-enforcing rib 81, acts to minimize deflection of the flattened side of cup 76. If desired the sleeve 80 and bearing 78 may be made integral, in which case said bearing is assembled into the bracket 79 and secured thereto before said bracket is located and welded into said cup 76. If desired member 75 may be omitted and member 64 of Fig. 8, employed in place thereof. Also if desired a re-enforcing cup as 63, or 18, may be added to the head portion of shell 65 and shell 82. After assembly of unit 75, the cylindrical surface of cup 76 may be finished, preferably to a sucking fit with the interior of shell 82, whereafter said unit is rigidly secured to said shell in a manner heretofore described, and as shown by welds 83—83. In Figs. 14 and 15, the shell 82 has been omitted for purpose of clearer illustration.

Referring to Fig. 17, comprising a machine similar in construction to an engine lathe; suitably mounted on one end of bed 84, is head stock 85 containing rotatable hollow shaft 86 also having axial movement, and mounted in which is collapsible chuck 87, of known construction and operated by rod 88. Rotatable chuck 89, is suitably mounted in the tail stock at the other end of bed 84, and is adapted to hold and rotate piston shell 65 in a predetermined path before gas flames from torch 90. Ring groove forming slide 91, also mounted on bed 84, is arranged to be advanced against shell 65 after chuck 87 has been inserted therein. If desired the groove forming tool 91, may be placed opposite chuck 87 and the chuck 89 made to advance shell 65 over chuck 87. Chuck 89 is rotated by belt 92 until the flames from torch 90 have heated shell 65 to the desired temperature for forming, whereafter slide 91 is advanced and the forming of ring grooves, as 66—66, is completed.

Referring to Fig. 18, comprising a hydraulic press having a bed portion 93, through which collapsible chuck 94 is adapted to be advanced and locked, and a liquid chamber housing 95, removably secured to said bed, said chamber having a hydraulic ram 96 adapted to develop pressure in chamber 97. A piston shell, as shown in Fig. 16, is placed over collapsible chuck 94 and advanced into hydraulic chamber 97 against stops 98—98 and thereafter locked in position whereafter ram 96 is lowered to create a pressure whereby the liquid in said chamber press the walls of said shell into the grooves of said collapsible chuck, in this manner forming ring grooves, as 66—66, in said shell. The chuck 94 is thereafter withdrawn from bed 93, collapsed and the piston shell removed. The grooves as 66—66, are preferably machine finished after forming.

After complete assembly of a piston and the flange, as 35, has been formed, or the separate flange re-enforcement, as 82a, has been added, the piston bearing surface, or exterior of the skirt is machine finished, whereafter said piston is aged, preferably by emersion in heated high fire test oil. The final operation consists of grind finish to the skirt exterior, at which time and if desired the piston pin bearings may be reamed to size for the particular pin to be inserted therein.

If desired the flange 35 may be omitted and an independent re-enforcing member, as 82a, substituted therefor. Further said re-enforcing member may have an elongated hole, similar to hole 22, and through which the connecting rod has free movement, such a modified member acting to prevent excess oil from entering the interior of the piston and be carbonized thereonto.

It will be noted that by the novel construction of employing an annular, or angular grooves as 9a, and notches as 16—16, cooperating with the orifices 17—17, means are obtained for collecting surplus, or excess oil and returning the same to the crank case without the employment of specially constructed oil rings of known construction. A piston of ordinary construction will out wear two to three sets of piston rings, and the applicant's novel system of oil collection permits the use of ordinary, as distinguished "oil rings", the former being lower in cost of manufacture and obviously sold at a lower price. If desired the groove 9a and notches 16—16, may also be placed on the lower side of groove 9, in this manner permitting the piston ring therein to collect oil during both the upward and downward movement of the piston.

The spaces 99—99 between re-enforcing member 18 and head 8, are preferably filled with a high heat conducting material as for example, aluminum whereby the heat from head 8 is more rapidly conducted away to the side walls of the piston and thence to the walls of the motor cylinder.

If desired the stampings as 5, 24, 51, 29, 58, 65, 71, 76, 79 and 82, also 41, 42, 43, 45, 46 and 47, may be made from duralumin to still further reduce the weight of the complete piston forming the applicant's invention.

What I claim is:—

1. A piston for internal combustion motors or the like comprising in combination; a stamped metal shell having a skirt portion arranged to act as the bearing face of the piston when operating in a cylinder bore of a motor, a reduced diameter cylindrical portion formed at the upper end thereof arranged to support one or more piston rings thereon having a head portion arranged to form the head of the piston, a plurality of piston pin bearings, means arranged to be secured to the inner wall of the skirt portion for supporting the bearings independently of the shell and means for rigidly securing the bearing supporting means to the skirt portion.

2. A piston for internal combustion motors or the like comprising in combination; a stamped metal shell having a skirt portion arranged to act as the bearing face of the piston when operating in a cylinder bore of a motor, a reduced diameter cylindrical portion formed at the upper end thereof arranged to support one or more piston rings thereon having a head portion arranged to form the head of the piston, a plurality of piston pin bearings, means arranged to be axially veriably secured to the inner wall of the skirt portion for supporting the bearings independently of the shell and means for rigidly securing the bearing supporting means to the skirt portion at a preselected axial location thereof.

3. A piston for internal combustion motors or the like comprising in combination; a stamped metal shell having a skirt portion arranged to act as the bearing face of the piston when operating in a cylinder bore of the motor, a reduced diameter cylindrical portion formed at the upper end thereof arranged to support one or more piston rings thereon having a head portion arranged to form the head of the piston, a plurality of piston pin bearings, a supporting member for supporting the bearings independently of the shell, and member for rigidly securing the bearing supporting means to the shell.

4. A piston for internal combustion motors or the like comprising in combination; a stamped metal shell having a skirt portion arranged to act as the bearing face of the piston when operating in a cylinder bore of the motor, a reduced diameter cylindrical portion formed at the upper end thereof arranged to support one or more piston rings thereon having a head portion arranged to form the head of the piston, a plurality of piston pin bearings, means for supporting the bearings independently of the shell and means for rigidly securing the bearings supporting means to the shell at predetermined and variable distances from the head thereof.

5. A piston for internal combustion motors or the like comprising in combination; a stamped metal shell having a skirt portion arranged to act as the bearing face of the piston when operating in a cylinder bore of the motor, a reduced diameter cylindrical portion formed at the upper end thereof arranged to support one or more piston rings thereon having a head portion arranged to form the head of the piston, a stamped metal re-enforcment member having a head portion the outer face of which is arranged to re-enforcingly abut the inner face of the head portion of the shell, a cylindrical portion formed on the re-enforcing member the outer wall of which is arranged to re-enforcingly impinge on the inner wall of the reduced diameter shell portion, a plurality of piston pin bearings, means for supporting the bearings and means for rigidly securing the bearing supporting means to the shell.

6. A piston for internal combustion motors or the like comprising in combination; a stamped metal shell having a skirt portion arranged to act as the bearing face of the piston when operating in a cylinder bore of the motor, a reduced diameter cylindrical portion formed at the upper end thereof arranged to support one or more piston rings thereon having a head portion arranged to form the head of the piston, a stamped metal re-enforcement member having a head portion, re-enforcing ribs formed therein arranged to re-enforcingly abut the inner face of the head portion of the shell, a cylindrical portion formed on the re-enforcing member the outer face of which is arranged to re-enforcingly impinge on the inner wall of the reduced diameter shell portion, a plurality of piston pin bearings, means for supporting the bearings and means for rigidly securing the bearing supporting means to the shell.

7. A piston for internal combustion motors or the like comprising in combination; a stamped metal shell having a skirt portion arranged to act as the bearing face of the piston when operating in the cylinder bore of the motor, a reduced diameter cylindrical portion formed at the upper end thereof arranged to support one or more piston rings thereon having a head portion arranged to form the head of the piston, a plurality of piston pin bearings, means for supporting the bearings independently of the shell, means for internally re-enforcing the reduced diameter and head portions of the shell, and means for rigidly securing the bearing supporting means to the skirt portion of the shell.

8. A piston arranged to operate in a cylindrical bore comprising in combination; a stamped metal shell, having a skirt portion arranged to act as the bearing face of the piston when operating in the bore, a head portion formed at the upper end thereof arranged to form the head of the piston, annular stamped members surrounding the head portion each having a single radially disposed flange portion positioned to form piston ring grooves between the flange portions for supporting piston rings therein, piston pin bearings, means for supporting the bearings and means for securing the bearing supporting means to the shell.

9. A piston arranged to operate in a cylinder bore comprising in combination; a stamped metal shell having a skirt portion arranged to act as the bearing face of the piston when operating in the bore, a reduced diameter cylindrical portion formed at the upper end thereof having a head portion arranged to form the head of the piston, annular stamped members surrounding the reduced diameter cylindrical portion each having a single radially disposed flange portion positioned to form piston ring grooves between the members for supporting piston rings therein, piston pin bearings, means for supporting the bearings, and means for securing the bearing supporting means to the shell.

10. A piston for internal combustion motors or the like comprising in combination; a stamped metal shell having a skirt portion arranged to act as the bearing face of the piston when operating in a cylinder bore of a motor, a reduced diameter cylindrical portion having a head portion formed at the upper end thereof, a plurality of angle ring members arranged to form piston ring grooves therebetween surrounding the reduced diameter portion and rigidly secured thereto, piston pin bearings, means for supporting the bearings and means for rigidly securing the bearing supporting means to the shell.

11. A piston for internal combustion motors comprising in combination; a stamped metal shell forming the head and skirt portion of the piston, a re-enforcing member for re-enforcing the head portion and the upper portion of the skirt portion rigidly secured thereto, a plurality of piston pin bearings, means for supporting the bearings independently of the shell, and means for rigidly securing the bearing supporting means to the shell.

12. A piston for internal combustion motors comprising in combination; a stamped metal shell member forming the head and skirt portion of the piston, means for re-enforcing the head portion and the upper portion of the skirt portion, rigidly secured thereto, a piston pin bearing member comprising, a stamped metal cup member having partially flattened and diametrically disposed wall portions, orifices formed in the flattened wall portions, chordally disposed brackets arranged within the cup member in a plane parallel to the flattened wall portions and rigidly secured thereto, orifices formed in the brackets disposed co-axially with the orifices in the flattened wall portions and piston pin bearings each arranged between a bracket and a flattened wall portion and rigidly secured in the orifices thereof, and means for rigidly securing the bearing member to the shell member.

13. A piston for internal combustion motors or the like comprising in combination; a stamped metal shell forming the head and skirt portion of the piston, a stamped metal re-enforcement member having a head portion, re-enforcing ribs formed therein arranged to re-enforcingly abut the inner face of the head portion of the shell and form voids therebetween, a cylindrical portion formed on the re-enforcing member the outer face of which is re-enforcingly arranged to impinge on the inner wall of the upper portion of the skirt, substantially high heat conducting metal members arranged in the voids, piston pin bearings, a member for supporting the bearings, and means for rigidly securing the bearing supporting member to the shell.

14. A piston for internal combustion motors or the like comprising in combination; a stamped metal shell forming the head and skirt portions of the piston, a stamped metal re-enforcement member having a head portion arranged to re-enforcingly abut the inner wall of the head portion of the shell, a cylindrical portion formed thereon the outer face of which is arranged to re-enforcingly impinge on the inner wall of the upper portion of the skirt, piston pin bearings, means for supporting the bearings, and means for rigidly securing the bearing supporting means to the shell.

15. A piston for internal combustion motors or the like comprising in combination; a stamped metal shell forming the head and skirt portion of the piston, a stamped metal re-enforcement member having a head portion arranged to re-enforcingly abut the inner wall of the head portion of the shell, a cylindrical portion formed thereon the outer face of which as arranged to re-enforcingly impinge on the inner wall of the upper portion of the skirt portion of the shell, a piston pin bearing unit comprising a tubular member having partially flattened and diametrically disposed wall portions, an orifice formed in each flattened wall portion, chordally disposed re-enforcing members arranged within the tubular member and secured to the cylindrical wall portion thereof, an orifice formed in each of the re-enforcing members, piston pin bearings each arranged between the flattened wall portion and a re-enforcing member and rigidly secured in the orifices therein, and means for rigidly securing the piston pin bearing unit to the shell.

16. A piston for internal combustion motors or the like comprising in combination; a stamped metal shell having a skirt portion arranged to act as the bearing face of the piston when operating in the cylinder bore of a motor, a reduced diameter portion formed at the upper end thereof arranged to support one or more piston rings thereon having a head portion arranged to form the head of the piston, a piston pin bearing unit comprising a tubular member having partially flattened and diametrically disposed wall portions, an orifice formed in each flattened wall portion, chordally disposed re-enforcing members arranged within the tubular member and secured to the cylindrical wall portion thereof, an orifice formed in each of the re-enforcing members, piston pin bearings positioned between the flattened wall portion and the re-enforcing members rigidly secured in the orifices therein, and means for rigidly securing the piston pin bearing unit to the shell.

17. A piston for internal combustion motors or the like comprising in combination; a stamped metal shell having a skirt portion arranged to act as the bearing face of the piston when operating in the cylinder bore of a motor, a reduced diameter portion formed at the upper end thereof arranged to support one or more piston rings thereon having a head portion arranged to form the head of the piston, piston pin bearings, a metal stamping for supporting the bearings independently of the shell, and means for securing the stampings together to form the piston.

18. A piston arranged to operate in a cylindrical bore comprising in combination; a shell member forming the skirt and head portions of the piston, a piston pin bearing unit arranged to be secured within the shell member, a plurality of chordally disposed walls formed within the skirt portion positioned on one side of the axis of the piston, a piston pin bearing interposed between and secured to the walls, a plurality of similar walls positioned on the opposite side of the axis of the piston, a piston pin bearing interposed and secured to the second named walls, and means for securing the unit to the shell member.

19. A piston arranged to operate in a cylindrical bore comprising, a head portion forming the top of the piston, a skirt portion joined thereto forming the sides of the piston, diametrically disposed orifices formed in the skirt portion between the head portion and the bottom of the piston arranged to receive a piston pin therethrough, piston pin supporting members arranged to support the piston pin, diametrically disposed orifices formed therein arranged to position the pin in the members, and members supported within the piston and solely by the skirt portion independently of the orifices therein for supportably positioning each member adjacently to a skirt orifice whereby a relatively wide space is formed between the members and a relatively less wide space is formed between each skirt orifice and the member positioned adjacent thereto.

20. A piston arranged to operate in a cylindrical bore comprising, a head portion, a skirt portion, diametrically disposed orifices formed in the skirt portion positioned between the head portion and the bottom of the piston, piston pin hub portions arranged to receive a piston pin therein, chordally disposed members positioned adjacently the orifices supported solely by the skirt portion arranged to support the outer ends of the hub portions, and other chordally disposed members positioned adjacent the axis of the piston supported solely by the skirt portion arranged to support the inner ends of the hub portions.

21. A piston arranged to operate in a cylindrical bore comprising, a head portion, a skirt portion, diametrically disposed orifices formed in the skirt portion positioned between the head portion and the bottom of the piston, piston pin hub portions arranged to receive a piston pin therein through the orifices, chordally disposed plate members positioned adjacently the orifices supported solely by the skirt portion arranged to support the outer ends of the hub portions, and other chordally disposed plate members positioned between the axis of the piston and the first named plate members supported solely by the skirt portion arranged to support the inner ends of the hub portions.

22. A piston arranged to reciprocate in a cylindrical bore comprising, a head portion, a cylindrical portion, diametrically disposed orifices formed in the cylindrical portion positioned between the head portion and the bottom of the piston, piston pin bearing portions, longitudinal re-inforcing portions arranged to support the bearing portions extending transversely of the orifices having the end portions thereof extending between wall sections of the cylindrical portion positioned adjacently to the orifices, and other longitudinal re-enforcing portions arranged to support the bearing portions positioned rearwardly of the first named re-enforcing portions in a chordal plane with respect to the cylindrical portion whereby the end portions thereof extend between wall sections of the cylindrical portion positioned solely each side of the orifices.

23. A piston arranged to reciprocate in a cylindrical bore comprising, a head portion, a cylindrical portion, diametrically disposed orifices formed in the cylindrical portion positioned between the head portion and the bottom of the piston, piston pin bearing portions, plate shaped re-enforcing portions arranged to support the bearing portions extending transversely of the orifices having the end portions thereof extending between wall sections of the cylindrical portion positioned adjacently to the orifices, and other plate shaped re-enforcing portions arranged to support the bearing portions positioned rearwardly of the first named re-enforcing portions and in a chordal plane with respect to the cylindrical portion whereby the end portions thereof extend between wall sections of the cylindrical portion positioned solely each side of the orifices.

24. A piston arranged to reciprocate in a cylindrical bore comprising, a head portion, a cylindrical portion, diametrically disposed openings formed in the cylindrical portion positioned between the head portion and the bottom of the piston, piston pin bearing portions, longitudinal re-enforcing portions supported solely by the end portions thereof, the end portions being supported adjacent oppositely disposed edges of the openings whereby the re-enforcing portions will extend transversely with respect to the openings and will be positioned adjacently thereto, other longitudinal re-enforcing portions spacedly disposed with respect to the first named re-enforcing portions also solely supported by the end portions thereof, the end portions being supported on opposite sides of the openings more remotely from the edges thereof whereby the last named re-enforcing portions will also extend transversely with respect to the openings and will be positioned more inwardly of the piston from the first named re-enforcing portions, the re-enforcing portions supporting the bearing portions at substantially the mid-longitudinal portions thereof whereby a piston pin may be inserted therein from the openings.

25. A piston arranged to reciprocate in a cylindrical bore comprising, a head portion, a cylindrical portion, diametrically disposed openings formed in the cylindrical portion positioned between the head portion and the bottom of the piston, longitudinal bearing supporting portions arranged to be supported solely by the end portions thereof, the end portions being supported adjacent oppositely disposed edges of the openings whereby the bearing supporting portions will extend transversely with respect to the openings and will be positioned adjacently thereto, other longitudinal bearing supporting portions spacedly disposed with respect to the first named bearing supporting portions also arranged to be solely supported by the end portions thereof, the end portions being supported on opposite sides of the openings more remotely from the edges thereof whereby the last named supporting portions will also extend transversely with respect to the openings and will be positioned more inwardly of the piston from the first named supporting portions, and bearing portions supported by the bearing supporting portions positioned at substantially the mid-longitudinal portions thereof arranged to receive a piston pin therein.

26. A piston arranged to reciprocate in a cylindrical bore comprising, a head portion and a cylindrical portion, diametrically disposed openings formed in the cylindrical portion positioned between the head portion and the bottom of the piston, longitudinal connecting portions arranged to be supported solely by the end portions thereof, the end portions being supported adjacently to oppositely disposed edges of the openings whereby the connecting portions will extend transversely with respect to the openings and will be positioned adjacently thereto, other longitudinal connecting portions spacedly disposed with respect to the first named connecting portions also arranged to be supported solely by the end portions thereof, the end portions being supported on opposite sides of the openings more remotely from the edges thereof whereby the last named connecting portions will also extend transversely with respect to the openings and will be positioned more inwardly of the piston from the first named connecting portions, and bearing portions supported by the connecting portions positioned at substantially the mid-longitudinal portions thereof arranged to receive a piston pin therein.

27. A piston arranged to reciprocate in a cylindrical bore comprising, a head portion forming the top of the piston, a cylindrical portion extending downwardly therefrom, diametrically disposed openings formed in the cylindrical portion positioned between the head portion and the bottom of the piston, longitudinal connecting portions arranged to be supported solely by the end portions thereof, the end portions being supported adjacently to oppositely disposed edges of the openings whereby the connecting portions will extend transversely with respect to the openings and will be positioned adjacently thereto, other longitudinal connecting portions spacedly disposed with respect to the first named connecting portions also arranged to be supported solely by the end portions thereof, the end portions being supported on opposite sides of the openings more remotely from the edges thereof and positioned on the same axial plane of the piston as the plane of the openings therein whereby the last named connecting portions will also extend transversely with respect to the openings and will be positioned chordally with respect to the cylindrical portion, and bearing portions supported by the connecting portions positioned at substantially the mid-longitudinal portions thereof arranged to receive a piston pin therein.

28. A piston for internal combustion motors comprising, a stamped metal shell having a skirt portion forming the bearing surface thereof, a reduced diameter portion positioned thereabove having a head portion forming the closure therefor, a plurality of channel ring members having grooves formed therein for supporting piston rings surrounding the reduced diameter portion and rigidly secured thereto, piston pin bearings, and means supported by the shell for rigidly supporting the bearings.

Signed at New York city, in the county of New York, and State of New York, this 25th day of February, A. D. 1926.

OSCAR A. ROSS.